United States Patent
Breitbach

[11] Patent Number: 5,765,817
[45] Date of Patent: Jun. 16, 1998

[54] INTERFACE FOR VIBRATION REDUCTION IN STRUCTURAL-DYNAMIC SYSTEMS

[75] Inventor: Elmar Breitbach, Göttingen, Germany

[73] Assignee: Deutsche Forschungsanstalt Fur Luft-Und Raumfahrt E.V., Bonn, Germany

[21] Appl. No.: 687,212

[22] Filed: Jul. 25, 1996

[30] Foreign Application Priority Data

Jul. 27, 1995 [DE] Germany ............ 195 27 514.4

[51] Int. Cl.⁶ ............................................ F16M 1/00
[52] U.S. Cl. ............... 267/136; 267/140.2; 188/267; 52/1
[58] Field of Search ............... 267/136, 140.2, 267/140.14; 188/267; 52/167.2, 167.4, 167.7, 167.8, 1

[56] References Cited

U.S. PATENT DOCUMENTS

| | | |
|---|---|---|
| 4,848,525 | 7/1989 | Jacot et al. .................. 188/378 |
| 5,236,186 | 8/1993 | Weltin et al. ................ 267/136 X |
| 5,373,670 | 12/1994 | Sasaki et al. ................ 52/167.2 X |

FOREIGN PATENT DOCUMENTS

| | | |
|---|---|---|
| 0 321 897 | 12/1988 | European Pat. Off. . |
| 0 472 046 | 8/1991 | European Pat. Off. . |
| 41 42 885 | 12/1991 | Germany . |
| 4-312239 | 11/1992 | Japan . |
| 2 205 921 | 5/1988 | United Kingdom . |
| 2 229 789 | 3/1989 | United Kingdom . |
| 2 222 657 | 6/1989 | United Kingdom . |
| 2 272 524 | 11/1992 | United Kingdom . |
| 93/01673 | 8/1992 | WIPO . |

OTHER PUBLICATIONS

Patent Abstracts of Japan, vol. 014, No. 033 (M-923), 22 Jan. 1990 & JP 01 269736, (Mitsubishi) 27 Oct. 1989.
Patent Abstracts of Japan, vol. 013, No. 385 (M-864), 25 Aug. 1989 & JP 01 135943 (Hitachi) 29 May 1989.

*Primary Examiner*—Lee W. Young
*Attorney, Agent, or Firm*—Thomas, Kayden, Horstemeyer & Risley

[57] ABSTRACT

An interface (3) for vibration reduction in structural-dynamic systems comprises a base-side construction element (8) and a structure-side construction element (9) and at least one actuator (14), for example a piezoelectric or a magnetostrictive actuator. The actuator (14) has a main direction (17), and the extension of the actuator (14) in its main direction (17) between a first engagement point (15) on the base-side construction element (8) and a second engagement point (16) on the structure-side construction element (9) can be voluntarily changed by means of a drive signal. Therein, the actuator (14) is under pressure prestress between the first engagement point (15) and the second engagement point (16), and at least one elastic element (18) is arranged in parallel to the actuator (14) between the base-side construction element (8) and the structure-side construction element (9), the elastic element (18) having a longitudinal stiffness parallel to the main direction (17) of the actuator (14) which is as low as possible, and a transversal stiffness perpendicular to the main direction (17) of the actuator (14) which is as high as possible.

16 Claims, 3 Drawing Sheets

INTERFACE FOR VIBRATION REDUCTION IN STRUCTURAL-DYNAMIC SYSTEMS

FIELD OF THE INVENTION

The invention relates to an interface for vibration reduction in structural-dynamic systems and comprises a base-side construction element and a structure-side construction element and at least one actuator having a main direction, for example a piezoelectric or a magnetostrictive actuator, the extension of the actuator in its main direction between a first engagement point on the base-side construction element and a second engagement point on the structure-side construction element can be voluntarily changed by means of a drive signal.

BACKGROUND OF THE INVENTION

Particularly, piezopolymers and piezoceramics any be used as a piezoelectric actuator. Alloys of rare earth elements are especially suitable as a magnetostrictive actuator. Besides, electrostrictive ceramics, shape changing alloys and polymers, electro-rheological fluids, magneto-rheological fluids and so on may be used in the interface. The important factor, however, is that the extension of the actuator between the two engagement points can be voluntarily changed by means of the drive signal. In this context, changing the extension includes changing the force with which the actuator engages at the engagement points, even if said changing the force is not associated with a substantial change in the extension between the engagement points.

An interface of the type described above is to be arranged between a base and a vibrating structure to selectively counteract the dynamic elastic deformations of the structure which are induced by vibrations of the base and to eliminate said deformations by means of interference as far as possible.

In addition, vibrations of the structure which have been activated in another way may also be eliminated by means of interference. To detect the vibrations induced in the structure and the vibrations of the base, a plurality of sensors is to be provided. The signals of these sensors are processed with control means to generate the drive signal for the actuators. In an ideal case, the actuator produces a dynamic deformation of the structure which is phase-inverted with regard to the original uninfluenced deformation, in the sense of a total mirror image with regard to the time axis. Particularly, adaptive electronics which adapt to the actual conditions of the base and the vibrating structure as well as to further factors may be used as suitable control means.

Applications of the invention include, for example, the vibrationless support of a satellite in a starting rocket, the prevention of the vibration transmission from the fuselage to the empennage ore to the wings of an airplane and so on. In such applications, it is particularly required that the interface is as lightweight as possible.

With the type of interfaces described above the actuator is exposed to considerable mechanical loads not only in the main direction in which pull and pressure loads occur but also perpendicular to the main direction where shearing and transverse loads occur. However, the actuators which are used, typically the piezoelectric and the magnetostrictive actuators, have low resistance to shearing and transverse loads. Moreover, their resistance to pull in the main direction is likewise low. Only is their resistance to pressure sufficient for withstanding the considerable mechanical loads to which they will be exposed.

It therefore can be appreciated that it would be desirable to have an interface of the type described above in which mechanical overloads on the employed actuators are avoided even in case of high loads on the interface. Further, desirable would be such an interface which is the interface shall be of simple construction which results in a low space required and a low weight.

According to the present invention, the problems are solved by providing a longitudinally extensible actuator that is under pressure prestress between the first and the second engagement point and also providing at least one elastic element arranged in parallel to the actuator between the base-side and the structure-side construction element. The elastic element has a longitudinal stiffness parallel to its central longitudinal axis or the main direction which is as low as possible and a transversal stiffness perpendicular to the main direction of the actuator which is as high as possible. The pressure prestress on the actuator, which is an elastic prestress, ensures that the actuator is not exposed to any pull loads. This means that, to match the prestress force, the prestress force must have the same magnitude as the maximum pull forces acting on the interface between the engagement points of the actuator. Preferably, the prestress force is even higher to provide a security reserve.

The shearing and transverse loads imposed on the actuator are avoided or, more precisely, reduced to the extent that the tolerable loads on the actuator are not exceeded by the elastic element arranged in parallel to the actuator. This is achieved with the aid of the high transverse stiffness of the elastic element perpendicular to the longitudinal axis or main extension direction of the actuator. In contrast, the longitudinal stiffness of the elastic element parallel to the main direction is preferably low to have an as low as possible effect on the changes of the extension of the actuator on the basis of the drive signal. Accordingly, the elastic element is substantially elastic along its longitudinal direction and substantially inelastic along its transverse direction. The remaining longitudinal stiffness of the elastic element has to be taken into consideration also when matching the total prestress force between the base-side and the structure-side construction elements.

The pressure prestress on the actuator may be applied an actuator precompression means such as one or more antifatigue bolts arranged in parallel to the actuator. The longitudinal stiffness of the antifatigue bolts in the main direction of the actuator, i.e. their spring rate, should be as low as possible to enable a selective change in the extension of the actuator on the basis of the drive signal.

The elastic element which is arranged in parallel to the actuator is preferably of tubular shape and has a tubular axis. The term "tubular shape" particularly means a tubular shape with a circular cross-section, because such tubes are known for their very high stiffiess perpendicular to their tubular axis. However, other cross-sections are also possible. Likewise , a diameter of the tube which is constant al non the tubular axis is not necessary.

The de sired low longitudinal stiffness of the tubular shaped element can be achieved, for example, by two tube sections telescopically arranged and elastically supported on each other Likewise, a single tube section can be telescopically guided at one construction element and elastically supported on this construction element. However, particularly for reasons of weight, it is preferred that the desired elasticities of the tubular shaped elastic element are provided by fibers, threads or wires arranged in the wall of the tubular shaped element. The fibers may be, for example, glass or carbon fibers; the threads may be metal ore textile threads; and the wires may be metal wires.

The desired transversal stiffness of the elastic element is particularly enhanced, if two equal shares of the fibers, threads or wires are, in opposite directions, spirally arranged around the tubular axis of the elastic element. In this arrangement equal shares in both directions are needed to avoid establishing a preferential direction about the tubular axis which would inevitable lead to undesired characteristics of the interface. Comparably stiff fibers, such as carbon fibers, or wires are particularly suitable for the spiral arrangement around the tubular axis.

The helix angel of the spirally arranged fibers, threads or wires is preferably about 45° relative to the tubular axis of the elastic element. However, the helix angle could be within the region from 30° to 60°. If the helix angle is substantially lower or higher, the longitudinal stiffness of the elastic element is negatively affected, i.e., undesirably increased.

A third share of the fibers, threads or wires can be arranged in parallel to the tubular axis of the elastic element. Fibers, threads, or wires arranged in parallel are less stiff than the fibers, threads, or wires arranged spirally. Less stiff fibers which have a high dilatablity as well as a sufficient resistance to pull but a low pressure stiffiess, for example, glass fibers and especially threads, are particularly suited for the arrangement in parallel to the tubular axis. It will be understood that the elastic element as a whole may not only comprise either fibers or threads or wires, but that there are application in which a combination of fibers and/or threads and/or wires has special advantages.

Particularly, if the tubular elastic element comprises fibers for defining its elasticities, these fibers are embedded in a shaping matrix. As a rule, the embedding of the threads or wires in a shaping matrix of the tubular elastic element is also useful. A suitable matrix is, for example, consisting of an isomorphous artificial resin.

Preferably, a plurality of actuators are arranged like a substantially circular ring about the elastic element to make full use of the elastic element and to arrange the elastic element and the actuator quasi-coaxially. In the case of a tubular elastic element, one actuator or a plurality of actuators can, alternatively or additionally, be arranged like a ring within the elastic element. On the other hand, it is also possible to arrange a plurality of elastic elements like a ring around one actuator, and eventually, to provide a further ring of actuators around these elastic elements. It is the decisive feature of all these arrangements, that the parallel arrangement of the actuators and the elastic elements does not lead to any undesired tilting moment between the base and the structure when all actuators change their extension in their main directions at the same time and with the same sign due to a corresponding drive signal.

At the same time, a substantially circular arrangement of a plurality of actuators enables a selective tilting of the structure relative to the base about any axis running perpendicularly through the axis of symmetry of the arrangement. To achieve this, only the actuators on one side of the tilting axis are to be driven for an increasing of their extension in their main direction. The asymmetric load on the actuators which is associated with this tilting is negligible if the ratio of the titling angle to the diameter of the ring-like arrangement is balanced.

The free orientation of the axis about which the tilting of the structure with regard to the base is performed includes a timewise changing axis, i.e. a periodically circulating axis. In such case the interface is comparable to a swash plate mechanism.

In a preferred embodiment of the interface, the base-side and the structure-side construction elements are flanged tubes, wherein the flanged tube are connected with each other by a plurality of antifatigue bolts arranged in a ring-like configuration, and wherein a guide is provided for the tubular elastic element at each tube flange, the guide supporting at least one radial surface of the tubular elastic element without backlash.

BRIEF DESCRIPTION OF THE DRAWINGS

In the following, the invention is explained and described in more detail by means of an embodiment example. Therein, FIG. 1 schematically shows the application of the interface, FIG. 2 show s a longitudinal cross section of the interface.

DETAILED DESCRIPTION

Figure 1:
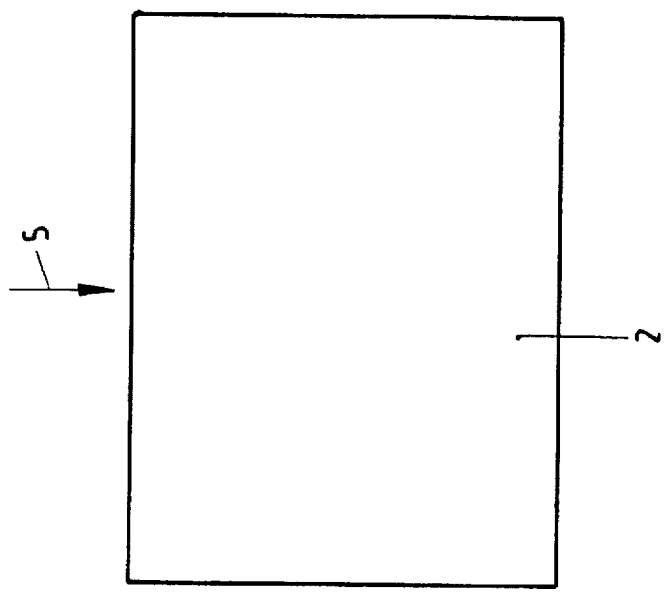
Figure 1:
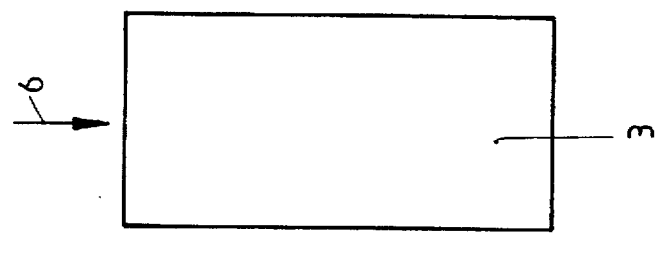
Figure 1:
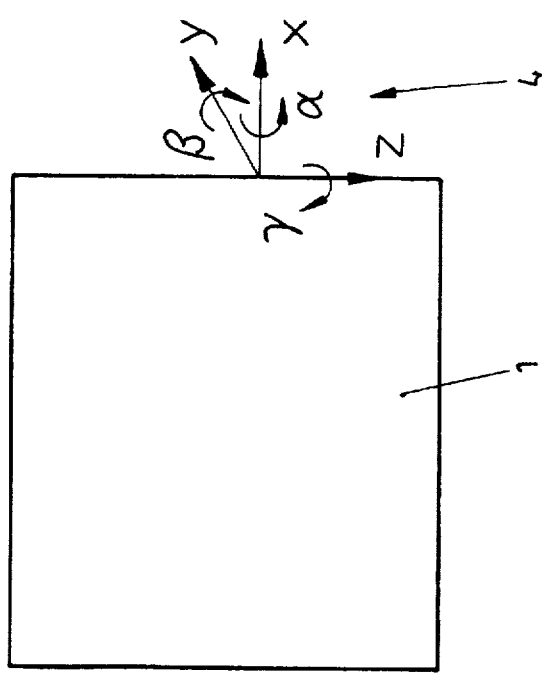

In FIG. 1 a base 1 and a structure 2 are shown between which a structural interface 3 is arranged. From the base 1 vibrations 4 are transmitted to the structure 2. The vibrations take place in the translational directions x, y and z and in the rotational directions a, B and r. Additionally, disturbances 5 directly engage the structure 2. The interface 3 is provided between the base 1 and the structure 2 to substantially eliminate both the vibrations transmitted from the base 1 to the structure 2 and the disturbances 5. The interface 3 engages the base 1 and the structure 2, and destructively superimposes the induced vibrations 4 and disturbances 5 with dynamic deformations of the structure 2 for compensation. A drive signal 6 is provided for driving the interface 3. The drive signal 6 is generated by an adaptive control device (not shown) which is responsive to output signals of sensors. The sensors are preferably arranged both on the base and o n the structure. (not shown)

Figure 2:
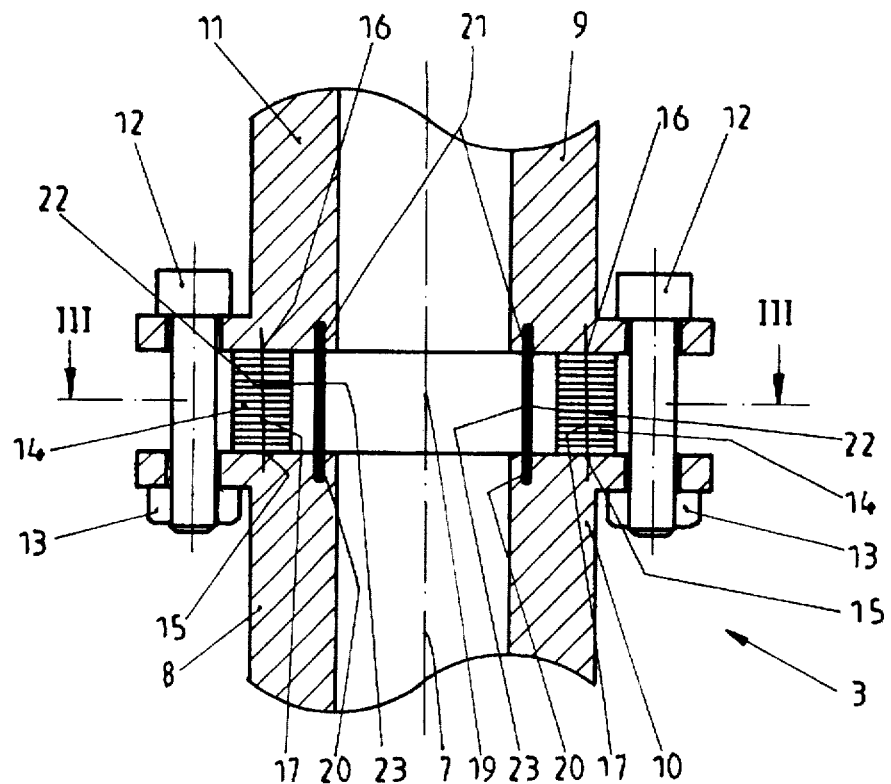
Figure 3:
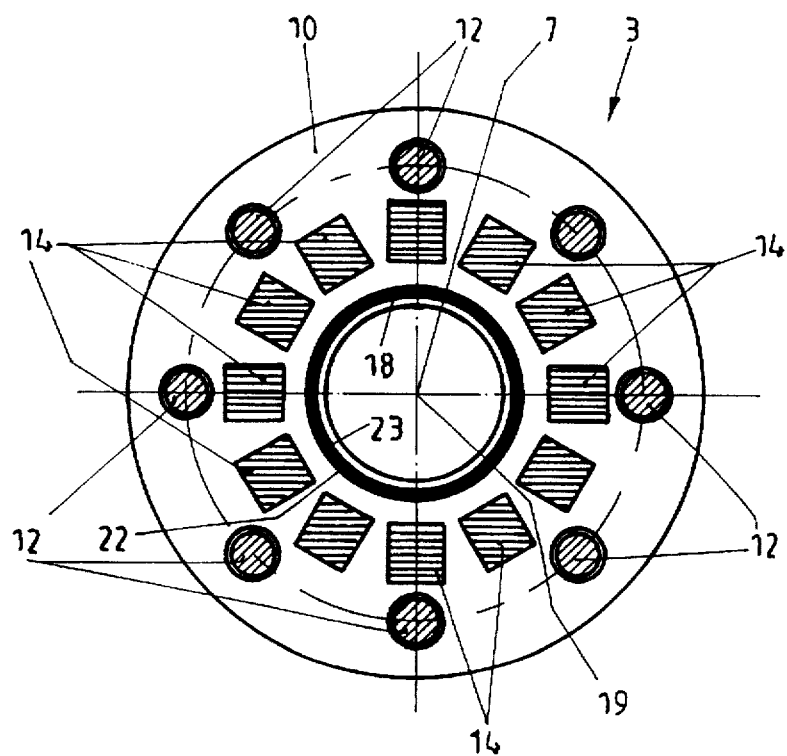
FIG. 3 shows a transverse cross section of the interface.

FIGS. 2 and 3 show the construction of the structural interface 3. This interface is not a universal interface which can cause dynamic deformation of the structure in all directions x, y and z as well as a, B, and r. Instead, the dynamic deformations caused by the interface 3 are limited to one translational direction, which is here designated the main direction 7, and to two rotational directions to which are here allocated pitch axis 27 and a gear axis 28 as tilting axes. The interface 3 has a base-side construction element 8 and a structure-side construction element 9. Both construction elements 8, 9 are formed as flanged tubes 10, 11. The flanged tubes 10, 11 are connected to each other by actuator precompression means antifatigue bolts 12 and nuts 13. Therein, the antifatigue bolts 12 are arranged in a substantially circular configuration around the main direction 7. A plurality of longitudinally extensible actuators 14 are arranged between the flanged tubes 10 and 11. This arrangement is substantially circular about the main direction 7. The actuators 14 engage the base-side construction element 8 and the structure-side construction element 9 at engagement points 15 and 16. The engagement points 15 and 16 are on longitudinal axes main directions 17 of the individual actuators 14. The main directions 17 are those directions in which the extension of the actuators 14 is changed by the driver signals 6. The mean of the main directions 17 coincides with the main direction of the interface 3. An elastic element 18 is provided within the ring of actuators 14. The elastic element 18 is arranged between the base-side construction element 8 and the structure-side construction element 9 and in parallel to the actuators 14. The elastic element 18 is of tubular shape and has a tubular axis 19 which coincides with the main direction 7. The elastic element 18 has a substantially high transverse stiffness perpendicular to the tubular axis 19 and a substantially low longitudinal stiffness in the direction of the central longitudinal or tubular axis 19. Support guides 20 and 21 are provided for the elastic element 18 at the flanged tubes 10 and 11, the guides supporting the radial surfaces 22 and 23 of the elastic elements 18 without backlash. Arranged in this manner, the structure minimizes the effect of forces applied perpendicular to the main directions 17 on the actuators 14 prevent to shearing or a transverse load. At the same time, a pressure prestress on the actuators 14 applied by the antifatigue bolts 12 minimizes the pulling forces applied to the actuators 14. So, only a harmless pressure load on the actuators 14 remains. Usual actuators, like piezoelectric actuators or magnetostrictive actuators are very resistant to pressure.

If each of the actuators 14 is driven so as to change its extension in its respective main directions 17 at the same time and with the same sign, a translational relative movement occurs between the base-side construction element 8 and the structure-side construction element 9 in the main direction 7. In the case of driving all actuators at the same time but with different signs on both sides of the pitch axis 27 or of the yaw axis 18, or in the case of driving only actuators on one side of these axes, a rotational relative movement between the base-side construction element and the structure-side construction element about the pitch axis 27 or the yaw axis 28, respectively, occurs. Through the superposition of rotational relative movements both about the pitch axis 27 and the yaw axis 28, it is possible to realize rotational relative movements about any tilting axis which is within the plane defined by the pitch axis 27 and the yaw axis 28 and perpendicular to the main direction 7. Therefore, timewise changing tilting axes are also possible, for example, periodically circulating tilting axes.

Figure 4:
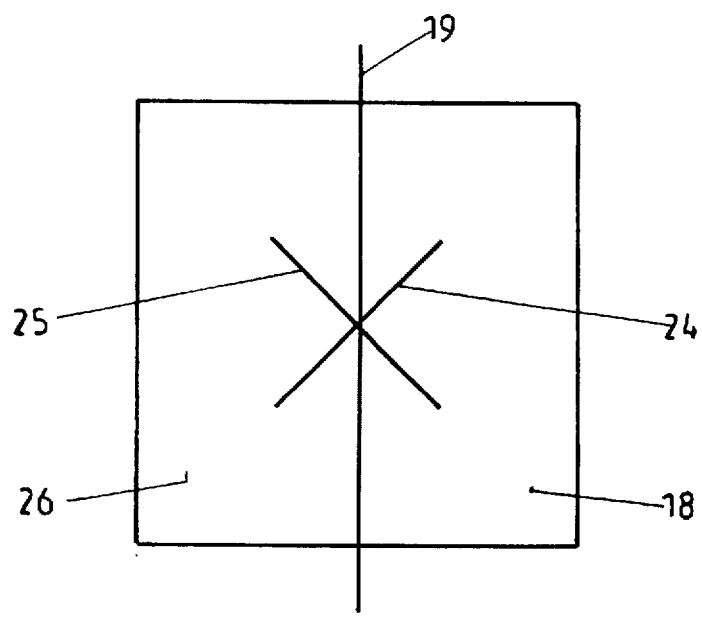
FIG. 4 shows a detail of the elastic element of the interface.

The desired elasticities of the elastic element 18 along and perpendicular to the tubular axis 19 are defined by means of fibers 24, 25 which are embedded therein these fibers form a matrix 26 within the elastic element 18 which, for example, consists of artificial resin. In FIG. 4, two fibers 24 and 25 are schematically depicted which stand for equal shares of the fibers in opposite directions spirally arranged around the tubular axis 19. Each of 24 and 25 form a helix angle of about 450 with regard to the tubular axis 19 The fibers typically are very stiff carbon fibers 19 which produce the desired high transversal stiffness of the elastic element 18. At the same time, the spiral arrangement of the fibers 24 and 25 prevents the arising of an undesired high longitudinals stiffness in the direction of the tubular axis 19. Accordingly, the elastic element is substantially elastic along its longitudinal direction and substantially inelastic along its transverse direction. Parallel to this direction, a third share of fibers may be arranged. In this case however, less stiff fibers are to be selected, for example, glass fibers. It is another possibility to embed threads directed along the longitudinal axis 19 into the matrix 26, the threads being dilatable and resistant to pull but having no pressure stiffness. Besides fibers and threads, wires may also be embedded in a suitable way in the matrix to achieve the desired different stiffness of the elastic element 18 in both the direction of the tubular axis 19 and the direction perpendicular to the tubular axis.

A particulary preferred embodiment of the interface is suitable for bearing loads up to 12,000 N perpendicular to the main direction of the interface 3. The general structure of this preferred embodiment of the interface is already described with reference to FIGS. 2 to 4. In one aspect of the invention, the tubular shaped elastic element 18 of the interface 3 has a length of approximately 18 mm, an outer diameter of approximately 100mm, an inner diameter of approximately 96 mm, and a wall thickness of 2 mm. The matrix 26 typically is comprised of Epoxid L2 SL made by Shell. T300 fibers made by TOREIKA are use as the fibers 24 and 25. The helix angles for the fibers 24 and 25 with regard to the tubular axis 19 are ±60°. The elastic modules in the direction of the tubular axis 19 is 8,700 N/mm², and the elastic modules perpendicular to the tubular axis 19 is 54,000 N/mm². The stiffness is $0.3 \times 10^6$ N/mm. Twelve antifatigue bolts 12 are used, each of which has a length of 96 mm and a diameter of 10 mm. The material of the bolts is high performance steel usable under cryogenic conditions. The stiffness of all antifatigue bolts is $2.1 \times 10^6$ N/mm. Fourteen piezo-actuators are used as the actuators 14, each of which has a diameter area of 100 mm² and a length of 18 mm. The stiffness is $4 \times 10^6$ N/mm. Without load, the actuators how an extension in their main direction of 15 μm on a control signal of 100 V. The maximum tolerable load on each actuator is 35,000 N. This preferred interface 3 described here is usable in a temperature range from −180° C. to +25° C.

While the invention has been disclosed in detail herein, it will be apparent to those skilled in the art that variations and modifications thereof can be made without departing from the spirit and scope of the invention as set forth in the following claims.

I claim:

1. A structural interface for vibration reduction in a structural-dynamic system, said interface comprising:

a base-side construction element;

a structure-side construction element;

at least one longitudinally extensible actuator having a first end in direct contact with said base-side construction element, a second end in direct contact with said structure-side construction element, and a longitudinal axis;

at least one elastic element having a longitudinal axis that is parallel with the longitudinal axis of said extensible actuator, said elastic element extending from said base-side construction element to said structure-side construction element and being substantially elastic along its longitudinal direction and substantially inelastic along a transverse direction perpendicular to the longitudinal direction; and actuator precompression means for applying an initial predetermined amount of compressive force to said at least one extensible actuator;

wherein said at least one longitudinally extensible actuator can be extended to produce a phase-inverted dynamic deformation of the structural-dynamic system to counteract the effect of vibrations applied to the system by an external force.

2. The structural interface of claim 1, wherein said actuator compression means comprises at least one antifatigue bolt that connects said base-side construction element to said structure-side construction element, said at least one antifatigue bolt being parallel to said at least one longitudinally extensible actuator.

3. The structural interface of claim 2, wherein said base-side construction element and said structure-side construction element each have a peripheral flange and said at least one antifatigue bolt extends through said peripheral flange of each construction element.

4. The structural interface of claim 1, wherein said elastic element is cylindrical and has a central longitudinal axis that is parallel to the longitudinal axis of said at least one actuator.

5. The structural interface of claim 4, wherein the substantial transverse inelasticity of said elastic element is provided by a matrix of substantially inelastic strands of material contained therein.

6. The structural interface of claim 5, wherein said substantially inelastic strands of material are composed of substantially inelastic fibers, substantially inelastic threads, or wires.

7. The structural interface of claim 5, wherein said substantially inelastic transverse strands are arranged in a substantially helical path within said cylindrical elastic element.

8. The structural interface of claim 7, wherein each pass of said substantially inelastic strands traverse said elastic element at an approximately 45° angle with respect to the central longitudinal axis of said elastic element.

9. The structural interface of claim 5, wherein said elastic element further includes a plurality of longitudinally arranged strands of material contained therein, wherein said longitudinally arranged strands are more elastic than said substantially inelastic transverse strands of material.

10. The structural interface of claim 9, wherein said longitudinal strands of material are composed of fibers, threads, or wires.

11. The structural interface of claim 1, wherein said base-side construction element and said structure-side construction element are each configured as a tube having a peripheral flange, said construction elements being connected to each other with a plurality of antifatigue bolts that extend through said flanges, said bolts being arranged in a substantially circular configuration about said tubes.

12. The structural interface of claim 11, wherein said interface comprises a plurality of longitudinally extensible actuators arranged between said base-side construction element and said structure-side construction element in a substantially circular configuration relative to the central longitudinal axis of said cylindrical elastic element.

13. The structural interface of claim 1, further comprising at least one support guide that provides support to said elastic element.

14. The structural interface of claim 1, wherein said at least one longitudinally extensible actuator is a piezoelectric actuator.

15. The structural interface of claim 1, wherein said at least one longitudinally extensible actuator is a magnetostrictive actuator.

16. A structural interface for vibration reduction in structural-dynamic system, said interface comprising:

a tubular base-side construction element having a substantially circular flange;

a tubular structure-side construction element having a substantially circular flange;

a plurality of extensible actuators, each having a first end in direct contact with said base-side construction element, a second end in direct contact with said structure-side construction element, and a longitudinal axis, said actuators being arranged in a substantially circular configuration;

at least one cylindrical elastic element extending from said base-side construction element to said structure-side construction element and having a central longitudinal axis that is parallel to the longitudinal axes of said extensible actuators, said cylindrical elastic element further having an internal matrix of substantially inelastic strands that reduce the elasticity of said elastic element along a transverse direction perpendicular to said central longitudinal axis; and actuator precompression means for applying an initial predetermined amount of compressive force to each of said extensible actuators;

wherein said longitudinally extensible actuators can be independently extended to produce a phase-inverted dynamic deformation of the structural-dynamic system to counteract the effect of vibrations applied to the system by an external force.

* * * * *